(No Model.) 2 Sheets—Sheet 1.
J. GARDAM.
Solar and Transit Instrument.
No. 243,543. Patented June 28, 1881.
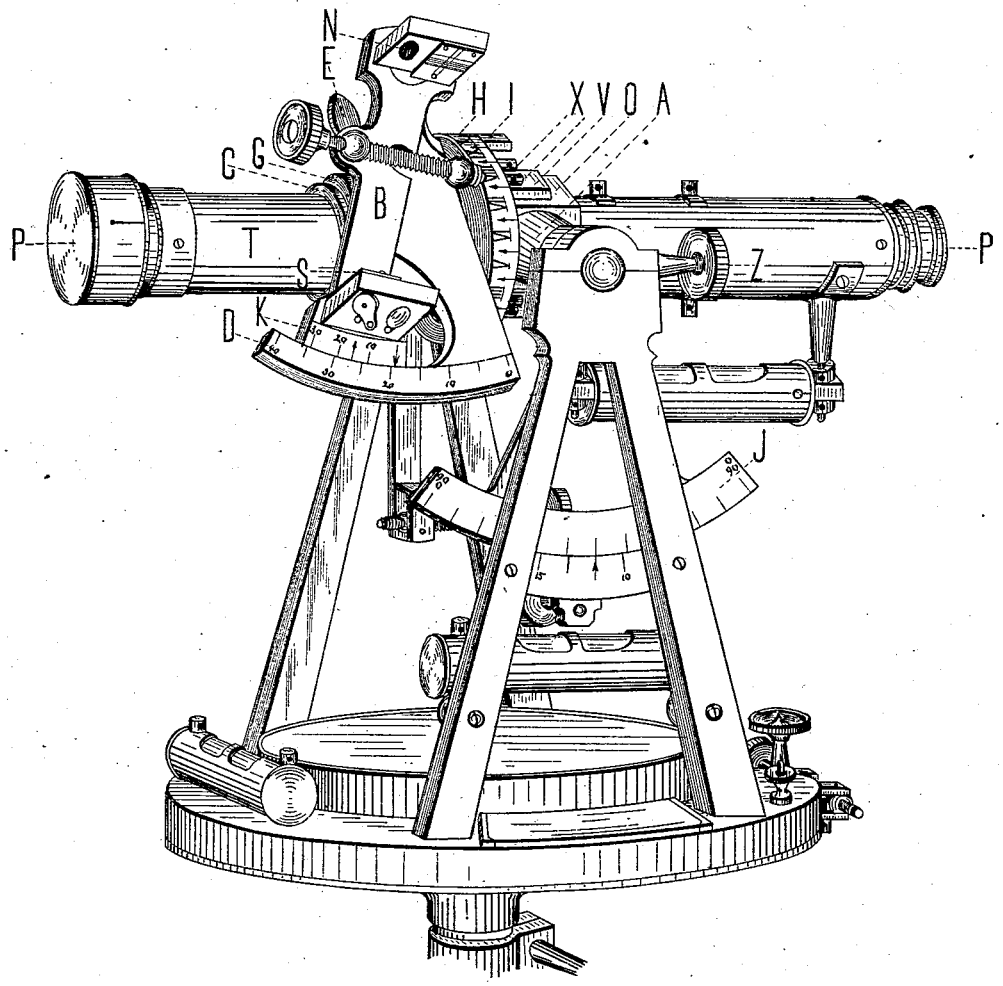
WITNESSES:
INVENTOR:
ATTORNEY:

(No Model.) 2 Sheets—Sheet 2.
J. GARDAM.
Solar and Transit Instrument.
No. 243,543.      Patented June 28, 1881.
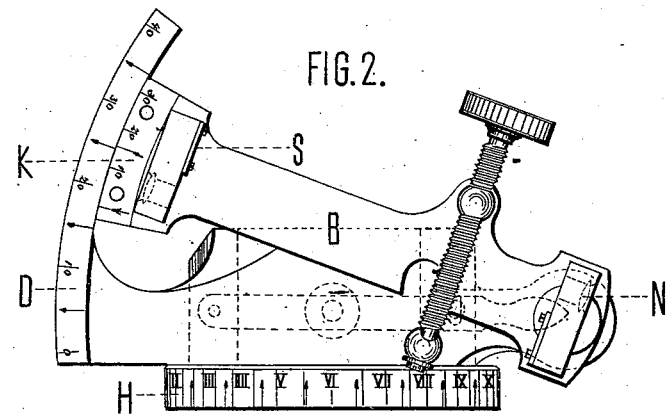
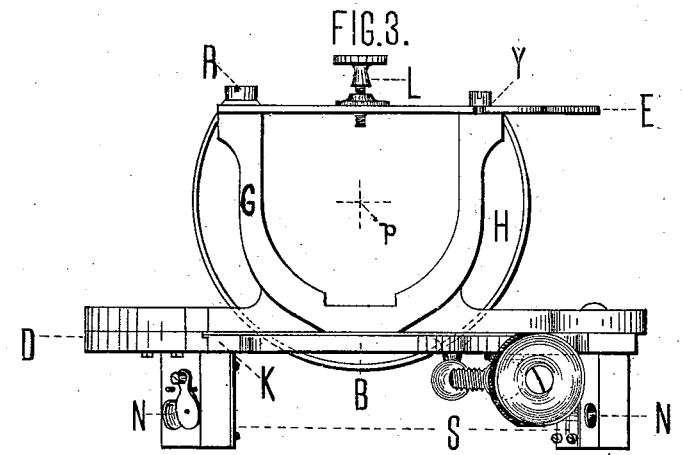
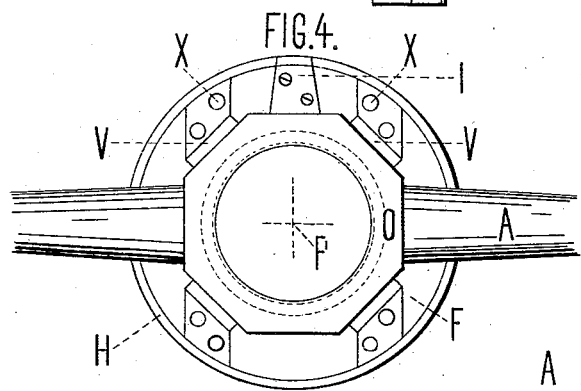
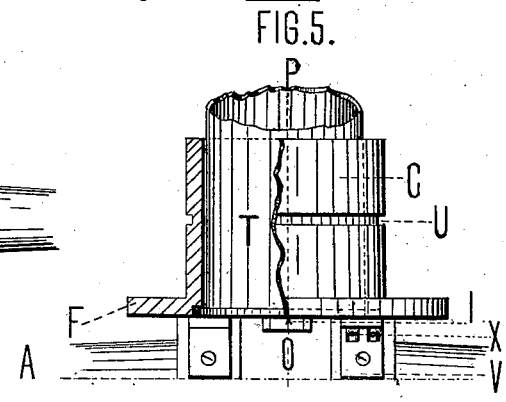
WITNESSES:      INVENTOR:

UNITED STATES PATENT OFFICE.

JOSEPH GARDAM, OF BROOKLYN, NEW YORK, ASSIGNOR OF TWO-THIRDS TO WILLIAM GARDAM AND FREDERICK W. GARDAM, OF SAME PLACE.

SOLAR AND TRANSIT INSTRUMENT.

SPECIFICATION forming part of Letters Patent No. 243,543, dated June 28, 1881.

Application filed December 1, 1880. (No model.)

*To all whom it may concern:*

Be it known that I, JOSEPH GARDAM, of Brooklyn, county of Kings, and State of New York, have invented a new and useful Improvement in Solar and Transit Instruments, which improvement is fully set forth in the following specification and accompanying drawings.

The object of my improvement is to provide a solar and transit instrument wherein the involved combination of solar apparatus and engineer's transit shall be more compact, enabling the operator to determine the longitude, latitude, true meridian, hour of the day, the sun's declination, and the magnetic variation with equal facility.

Figure 1 represents the combined instruments, or my improved solar and transit instrument. Figs. 2 and 3 illustrate, respectively, elevation and plan of the solar apparatus. Fig. 4 represents an end view of the collar or hollow center C, as seen from the eye-piece end of the telescope, and partially screened from view by the telescope-saddle O. Fig. 5 illustrates a longitudinal section and view of the collar or hollow center C.

A suitable collar or hollow center, C, provided with a right-angled flange, F, Fig. 5, being passed longitudinally over the transit-telescope T, is fixed and adjusted at its flanged extremity by means of the capstan-head screws X to the telescope-axis A at O through agency of the angle-pieces V, Figs. 4 and 5. The semi-annular ring or body G, with its attached hour-circle H, declination-arc D, and image or lens bar B, is now placed upon the collar or hollow center C, Fig. 5, and is retained in position by means of the clamp-screw L, Fig. 3, which, while traveling in the requisite groove U of the collar C in a revolution of the solar apparatus about the telescope T, also answers as a clamp whereby to permanently fix the hour-circle H opposite the indices I, as occasion may require.

In the event of the transit-telescope admitting of the attachment of a solar apparatus having a full hour-circle it would be but necessary to allow the screw L to pass through the full or complete ring or body G of the solar apparatus; but as the instrument here shown has been constructed with reference to the performance of removing or attaching the solar apparatus at will, said clamp-screw L passes through the bar E, which, being centered upon the pivot R and clamped through a slot and shoulder at Y, precludes the possibility of the solar apparatus being removed until clamp-screw L and bar E have been released.

It is obvious that other methods might be adopted for readily attaching or removing the solar apparatus, in consequence whereof I do not confine myself to the use of said bar E.

It is further requisite that the transit be supplied with a vertical arc, J, Fig. 1, clamped to the axis A by clamp-nut Z, and reading from 0° to 90°, whereby to adjust the telescope for the latitude of the station.

In determining the true meridian, for example, first level the instrument and the telescope in the ordinary manner, setting the vertical arc J to 0° and clamping it to the telescope-axis A by clamp-nut Z, Fig. 1. Next set the vertical arc J for the latitude of the station, which will cause the telescope to travel with it. Then, by reference to the nautical almanac, find the sun's declination for the day and hour which is set by the vernier K and declination-arc D. The time being known, set the hour-circle H to the index I and clamp by screw L. The transit is now revolved on its lower centers until the sun imprints its image through lens N on the opposite graduated silver plate S. In this position the optical axis P of the telescope is in the true meridian, and the needle indicates the magnetic variation.

Having thus described my invention, what I claim as new, and desire to secure by Letters Patent, is—

1. As an improvement in solar and transit instruments, a flanged collar or hollow center, C, adapted to be placed over the body of the telescope, and provided with adjusting-screws X, by means of which it is secured and adjusted to said telescope, in combination with a full or semi-annular ring, G, fitted to turn thereon, and provided with an hour-circle, declination-arc, and image or lens bar, substantially as and for the purpose set forth.

2. In a solar and transit instrument, the hour-circle H, declination-arc D, and image or lens bar B, affixed to the full or semi-annular ring or body G, fitted to and revolving upon a collar or hollow center, C, encircling the transit-telescope T, substantially as shown and described.

JOSEPH GARDAM.

Witnesses:
WALTER LARGE,
JAMES E. DUNN.